United States Patent
Martinez

(10) Patent No.: US 7,581,636 B2
(45) Date of Patent: Sep. 1, 2009

(54) AUTOMATIC FEEDER FOR BAKERY PRODUCTS

(75) Inventor: Juan Martin Bribiescas Martinez, Edo. de Mexico (MX)

(73) Assignee: Grupo Bimbo, S.A.B. de C.V., Mexico City (MX)

(*) Notice: Subject to any disclaimer, the term of this patent is extended or adjusted under 35 U.S.C. 154(b) by 69 days.

(21) Appl. No.: 11/511,879

(22) Filed: Aug. 29, 2006

(65) Prior Publication Data

US 2007/0166145 A1    Jul. 19, 2007

(30) Foreign Application Priority Data

Aug. 30, 2005    (MX)    .......... PA/A/2005/009225

(51) Int. Cl.
B65G 17/46    (2006.01)
B65G 17/30    (2006.01)
B65G 43/08    (2006.01)

(52) U.S. Cl. ........... 198/690.1; 198/679; 198/418.6; 198/464.2; 198/439; 198/472.1; 198/479.1

(58) Field of Classification Search ............ 198/472.1, 198/479.1, 418.6, 464.2, 679
See application file for complete search history.

(56) References Cited

U.S. PATENT DOCUMENTS

| | | | | |
|---|---|---|---|---|
| 4,633,652 A | * | 1/1987 | Dagenais et al. ........... 53/444 |
| 4,945,825 A | * | 8/1990 | Florindez ........... 99/353 |
| 5,052,542 A | * | 10/1991 | Wipf ........... 198/370.08 |
| 5,476,035 A | * | 12/1995 | Florindez ........... 99/443 C |
| 6,055,895 A | * | 5/2000 | Kanazawa ........... 83/24 |
| 6,065,390 A | * | 5/2000 | Florindez ........... 99/334 |

* cited by examiner

*Primary Examiner*—Gene Crawford
*Assistant Examiner*—Kavel P Singh
(74) *Attorney, Agent, or Firm*—Fish & Richardson P.C.

(57) ABSTRACT

An automated feeder transports pastry product dishes and/or moulds and includes a movable headstock arranged transversely above a first conveyor. The headstock includes an upper plate, a main linear actuator attached thereto, a lower mobile plate extendable by the main linear actuator, and a plurality of magnetic elements attached to the lower mobile plate. The magnetic elements hold a plurality of metallic plates in a predetermined arrangement. The headstock also includes at least two secondary vertical linear actuators disposed on the upper plate for actuating a releasing mechanism to dislodge the dishes from the magnetic elements and a transportation mechanism to provide longitudinal movement along a pair of longitudinal rails. The transportation mechanism permits the headstock to move between a first position over the first conveyor to a second position over a second.

6 Claims, 4 Drawing Sheets

AUTOMATIC FEEDER FOR BAKERY PRODUCTS

FIELD OF INVENTION

The present invention falls within the field of means, devices and equipment used for the management and handling of moulds for bakery products in the bakery industry. More specifically, it refers to an automated feeder of pastry product plates and/or moulds to the forming train.

BACKGROUND OF INVENTION

Currently, in the pastry industry, machines or devices are needed to allow the feeding and dosing of plates or moulds with different configurations or shapes for miscellaneous bakery products, in a continuous way towards other conveyors. It is known that in this industry it is necessary to group and form moulds to deposit the dough for different pastry products that will afterwards be dosed to the cooking oven.

The moulds or dishes commonly used for these purposes are metallic and in many cases the dosing, grouping and forming of such moulds or small dishes was made by hand, which implied a high labor, high production costs and likely contamination.

We know about pneumatic equipment that use the principle of vacuum generation through nozzles or foot valves with vacuum generation system with which the dishes or metallic moulds are fastened; nevertheless, since they are metallic moulds or dishes with a determined weight, the strength of vacuum generated is not sufficient to keep the dishes fastened and suspended during their transportation from one conveyor to another; in addition, with the movements generated in the transportation, the vacuum breaks in many cases releasing the dishes that fall down in an inverted position, unaligned or go out of the conveyor, affecting the formation, alignment of the moulds and therefore the dosing of the dough.

The development of an automated feeder of pastry product dishes to the forming train intends to perfect the operation, reducing the process times, increasing productivity, in addition to increasing the operation and process speeds as well as decreasing the production costs. Based on the preceding purposes, an equipment was development that performs such operation in the best way.

OBJECTIVES OF THE INVENTION

The main objective of this invention is to have available an automated equipment that will allow to feed pastry product dishes and/or metallic moulds to a forming train, in an efficient, functional and continuous way, in well-defined and ordered rows with a pre-established arrangement.

Another objective of the invention is to have available such automated feeder of pastry product plates and/or moulds to the forming train that will also allow a better working rate of the equipment, the reduction of process times, the increase of productivity, the increase of operation and process speeds as well as the reduction of production costs.

Another objective of the invention is to allow such automated feeder of pastry product plates and/or moulds to the forming train to also operate in a perfectly synchronized way and to allow a continuous dosing in the conveyor of the forming train without leaving spaces between each dosing batch, keeping an equidistant ratio of space between the dish and the dosed dish and between each batch.

Other objectives and advantages of this invention will be apparent after studying the next description and the drawings that are enclosed for exclusively but not limitative purposes.

BRIEF DESCRIPTION OF THE INVENTION

The automated feeder of pastry product plates and/or moulds to the forming train, pursuant to this invention, consists of a movable headstock arranged transversely over the conveyor of the forming train, which includes a first upper plate where a first main linear actuator is fixed in the center, which in its retractile end is fastened to a second lower mobile plate, such second mobile plate includes in its lower face a number of magnetic elements to hold the metallic plates, properly located and distributed in a predetermined arrangement; such first upper plate includes guides where the vertical poles move, which are fastened to the upper face of such second lower mobile plate to allow a uniform vertical movement originated by such main linear actuator, which allows to lower the second lower mobile plate to hold the dishes from the dish conveyor, to raise it to lift the dishes and to lower it again when the headstock has the desired position where the dishes will be deposited and to raise again to return to the initial position.

Such upper plate also includes at least two side secondary vertical linear actuators that in their retractile end are fastened to a pushing means that when being activated by such actuators push the ends of the dishes that are fastened magnetically to such number of holding magnetic elements, breaking the magnetic force to release the dishes in the conveyor of the forming train in the required position.

Such feeding headstock also includes a transportation mechanism that provides a longitudinal movement over a pair of longitudinal rails arranged over such conveyor of the forming train, fixed in an upper supporting structure, which allows that the headstock moves from a first position over a conveyor of dishes where it holds the dishes up to a second position over the conveyor of the forming train where the dishes will be dosed.

One of the preferred modes of the headstock transportation mechanism consists of follower means arranged on each side of such first upper plate; such follower means are mounted on each longitudinal rails arranged laterally over such conveyor of the forming train; each follower means is driven by a set of sprockets and a chain circuit that receives driving-motion directly from the main driving-motion of the conveyor of the forming train.

Another of the modes of the headstock transportation mechanism consists of a linear actuator fixed horizontally to the upper supporting structure and in its retractile end fastened to the first mobile plate that when activated gives a horizontal movement to the headstock in both directions of the longitudinal section of the conveyor of the forming train, moving the lateral follower means of such first supper plate through the longitudinal rails.

The preferred mode of such pushing means of the dishes to release them from the magnetic elements, consists of frames arranged over and around each row of holding magnetic elements, which are bigger in size than the size of the magnetic elements and lower in size than the size of the metallic dishes, to act as driving butt; it might consist also of a grid that includes a number of cells, where each cell is bigger in size than the sizes of the magnetic elements and lower in size than the sizes of such metallic dishes, to act as driving butts and to beat the magnetic force that keeps the dishes affixed to such magnetic elements.

For a better understanding of the invention characteristics enclosed to this description; as an integral part thereof; are the drawings with illustration purposes but not limitative; that are described next:

Figure 1:
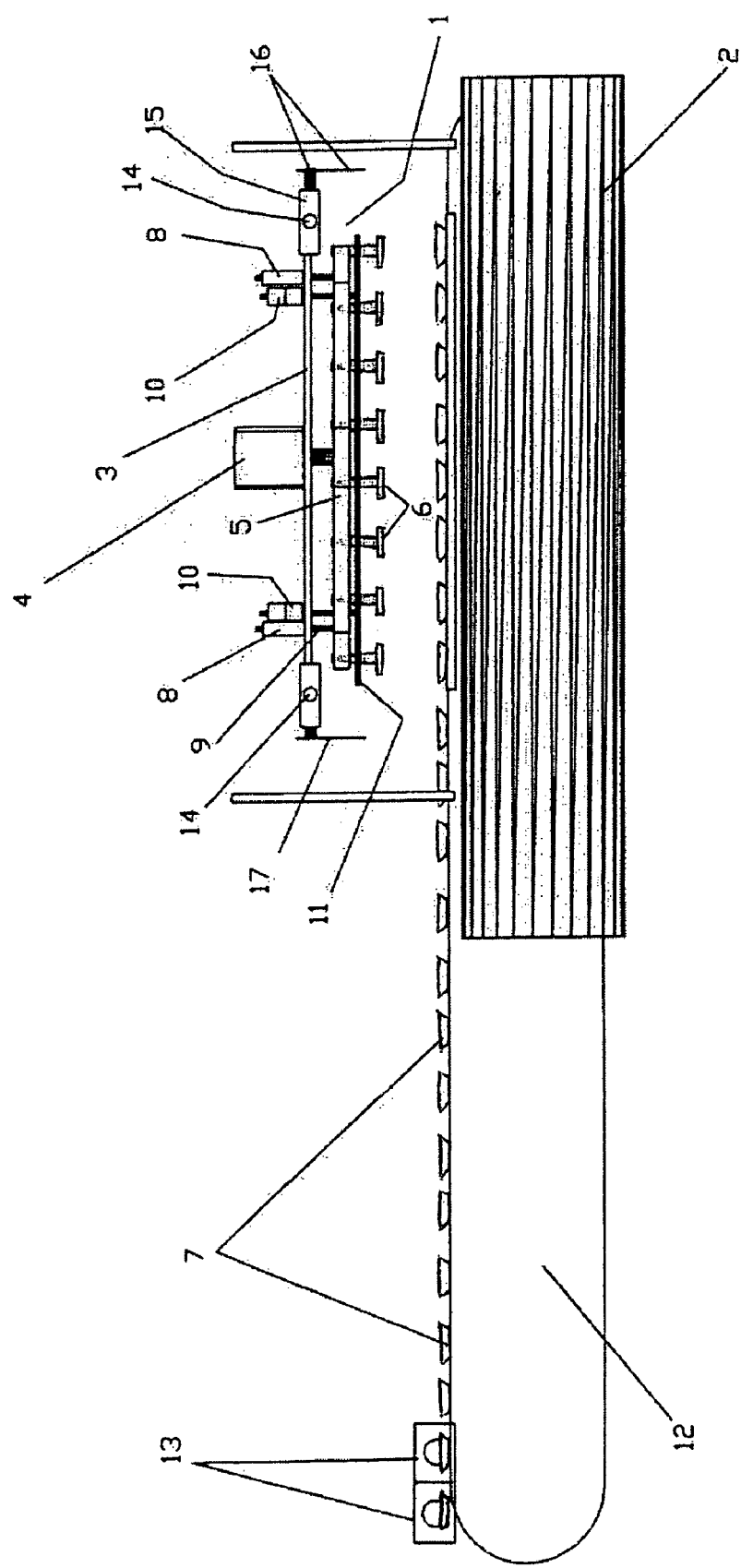
FIG. 1 shows a side view of the automated feeder of pastry product plates and/or moulds to the forming train.
Figure 2:
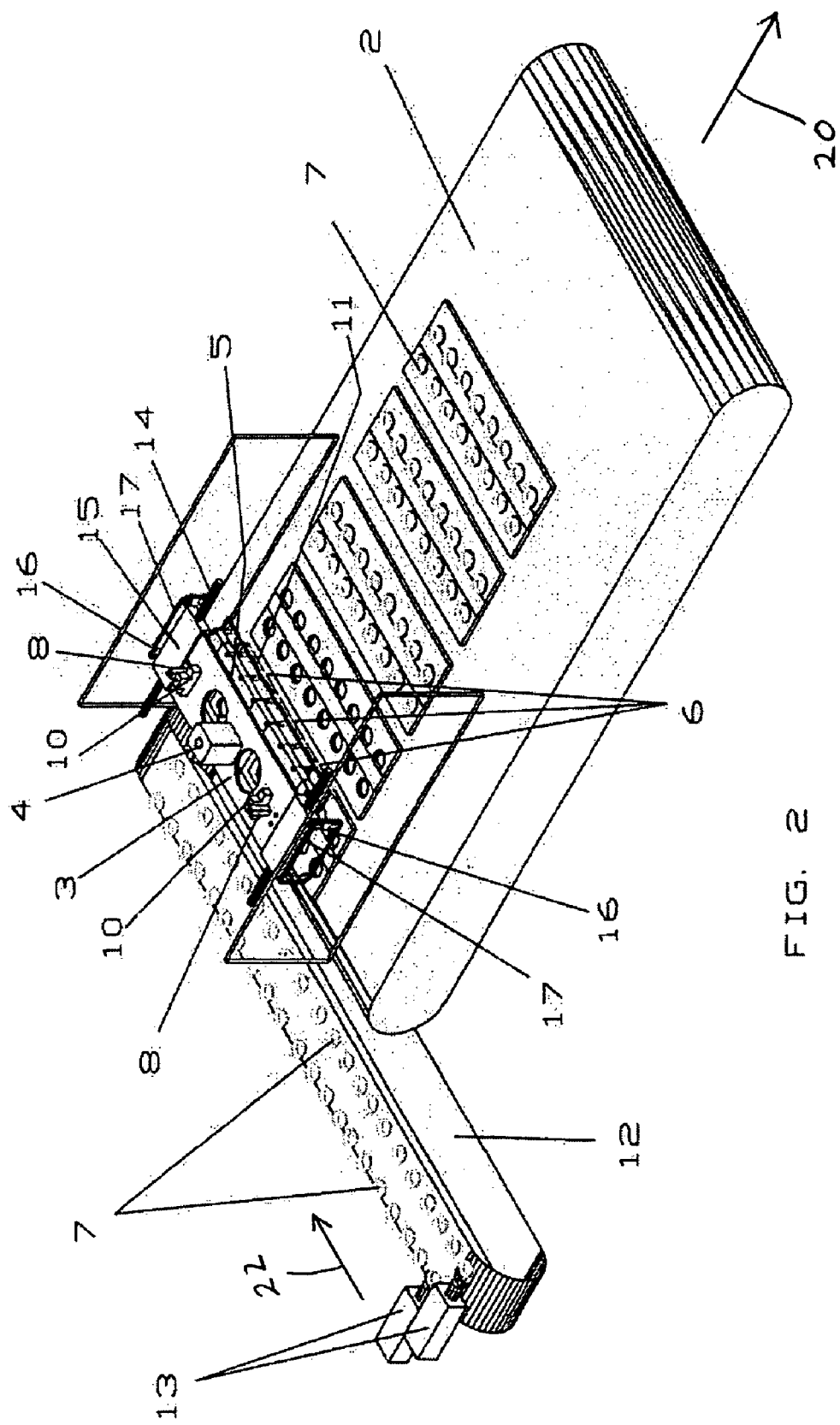
FIG. 2 illustrates a conventional view of the automated feeder of pastry product plates and/or moulds to the forming train.

For a better understanding of the invention, we will proceed to make a detailed description of any of its modes, showed in the drawings with illustration purposes, but not limitative, which are enclosed to this description.

DETAILED DESCRIPTION OF THE INVENTION

The characteristic details of the automated feeder of pastry product plates and/or moulds to the forming train, are clearly shown in the following description and in the illustration drawings that are enclosed, which shall be used as points of reference to mention the parts being referred to.

Figure 3:
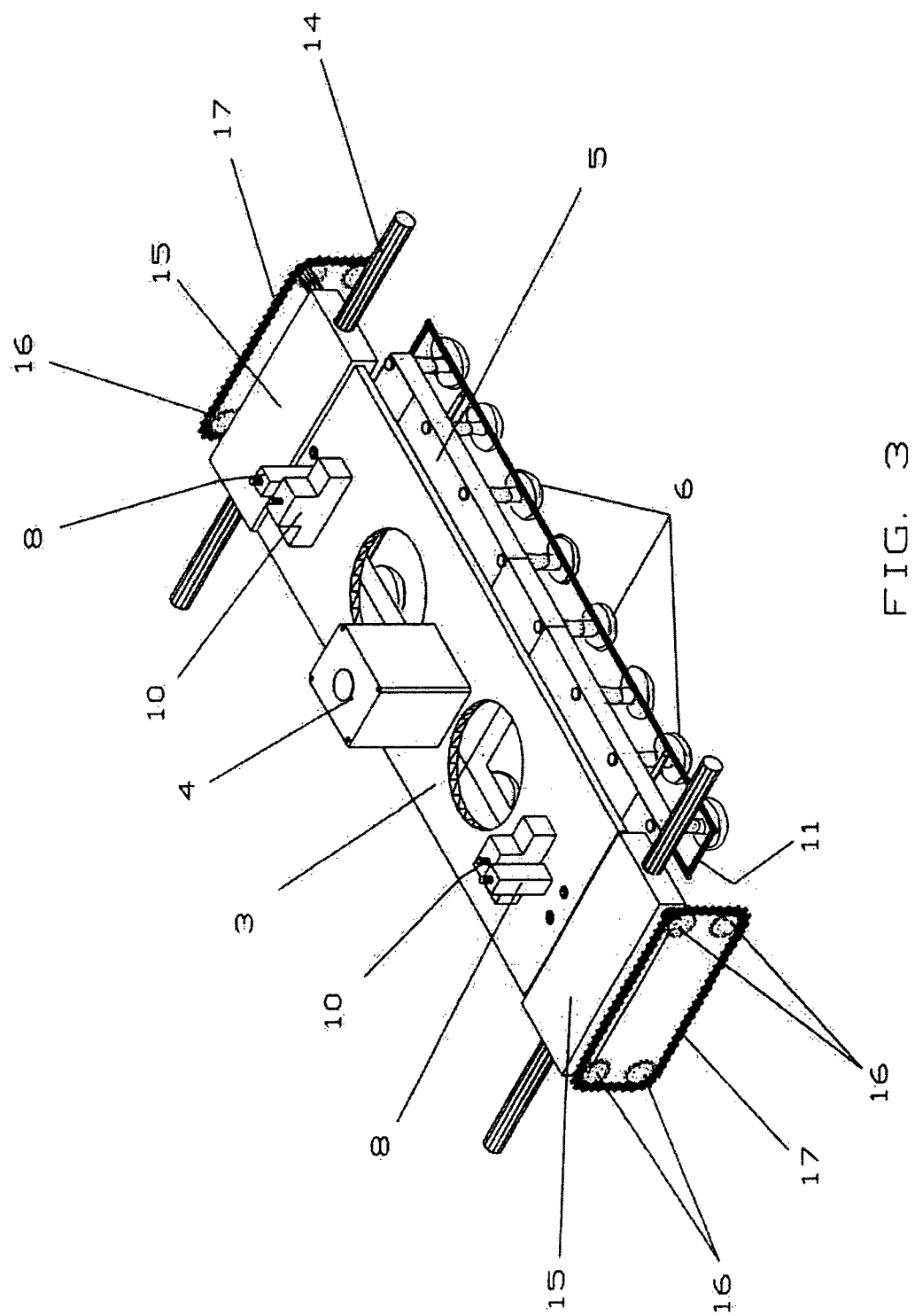
FIG. 3 shows a conventional view of the movable headstock of the automated feeder of pastry product plates and/or moulds to the forming train.

Making reference to FIGS. 1 and 3, the automated feeder of pastry products to the forming train consists of a movable headstock 1 arranged transversely over the conveyor of the forming train 2, such headstock includes a first upper plate 3 where a first main linear actuator 4 is fixed in the center, which in its retractile end is fastened to a second lower mobile plate 5, such second mobile plate 5 includes in its lower face a number of magnetic elements 6 to hold the metallic plates 7, properly located and distributed in a predetermined arrangement; such first upper plate 3 includes guides 8 where the vertical poles 9 move which are fastened to the upper face of such second lower mobile plate 5 to allow a uniform vertical movement originated by such main linear actuator 4.

Such fixed upper plate 3 also includes at least two side secondary vertical linear actuators 10 arranged laterally that in their retractile end are fastened to a pushing means 11 that when being activated by such secondary vertical actuators 10 push the ends of the dishes 7 that are fastened magnetically to such number of magnetic elements 6 that hold the metallic dishes 7, breaking the magnetic force to release the dishes 7 in the conveyor of the forming train 2 in the required position.

The movable headstock 1 takes the dishes 7 from a conveyor 12 of dishes arranged perpendicularly at the beginning of the conveyor of the forming train 2, where the dishes are dosed through dosing cylinders 13.

Such movable headstock 1 to feed the dishes 7 also includes a transportation mechanism that provides a longitudinal movement over a pair of longitudinal rails 14 arranged laterally over such conveyor of the forming train 2, fixed in an upper supporting structure (not shown), which allows that the headstock 1 moves from a first position over a conveyor 12 of dishes 7 where it holds the metallic dishes 7 up to a second position over the conveyor of the forming train 2 where the metallic dishes 7 will be dosed. Such transportation mechanism consists of lateral follower means 15 arranged on such first upper plate 3; such lateral follower means 15 are mounted on each longitudinal rails 14 arranged laterally over such conveyor of the forming train 2; each follower means 15 is driven by a set of sprockets 16 and a chain circuit 17 that receives driving motion directly from the main driving motion of the conveyor of the forming train 2 (the driving motion is not showed).

In its operation, the movable headstock in its first position is arranged lifted over the conveyor 12 of dishes 17 where the dishes are dosed by two dosing cylinder 13, generating two continuous rows of dishes over such conveyor 12.

Sensing means are arranged on such movable headstock 6 or in the upper supporting structure (not shown) to detect the metallic dishes 7 over such conveyor 12, once detected, the first vertical linear actuator 4 is activated that lowers the second lower mobile plate 5 that includes a number of magnetic elements 6 distributed in two rows with the same separation between both rows and with the same separation between such magnetic elements 6 in correspondence with the separation of such dishes 7 rows and with the separation between dish and dish 7, respectively; in such a way that each magnetic element 6 holds a metallic dish 7.

Once the dishes are fastened by the magnetic effect of such magnetic elements 6, such first vertical linear actuator 4 is activated in reverse direction lifting such second lower mobile plate 5 and once such plate is up or in the lifting process, the transportation mechanism is activated which by means of a set of sprockets 16 and a chain circuit 17 that receives driving motion directly from the main driving motion of the conveyor of the forming train 2 (the driving motion is not showed) originates the longitudinal movement of the headstock 1 when the lateral follower means 15 of such first upper plate 3 moves over such longitudinal rails 14 until it takes it over and at the beginning of the conveyor of the forming train 2 where it stops; next such first main linear actuator 4 is activated again lowering such second lower mobile plate 5 getting it close to such conveyor of the forming train 2 and in this position the two secondary vertical linear actuators 10 are activated lowering the pushing means 11 that pushes the ends of the metallic dishes 7 to break the magnetic force and release the dishes 7 that are deposited over such conveyor of the forming train 2 in two well defined rows.

Such actuators 4 and 10 are activated again to lift the second lower mobile plate 5 and such pushing means 11, respectively, activating in the reverse direction the transportation mechanism, returning the headstock to the original position and executing a new cycle.

Figure 4:
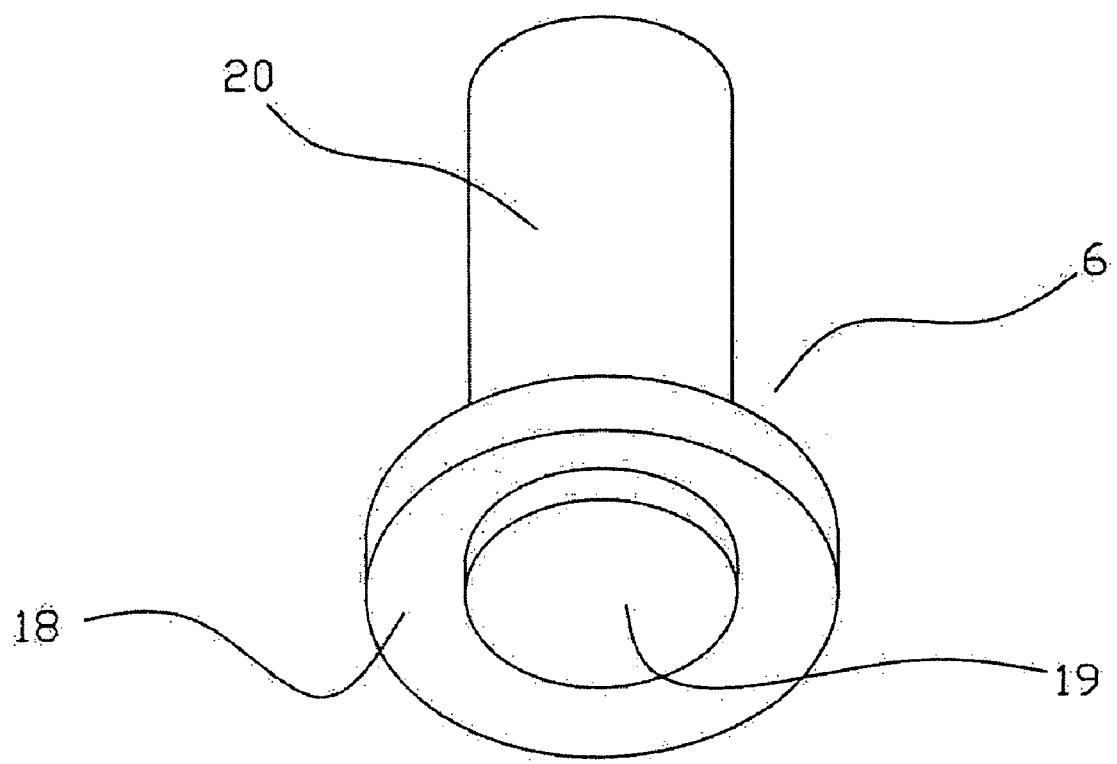
FIG. 4 illustrates a conventional perspective view with lower appreciation of a magnetic element to hold the metallic dishes.

Making reference to FIG. 4 that illustrates a conventional perspective view with lower appreciation of a magnetic element to hold the metallic plates. In such figure, the magnetic element 6 consists of a flat circular bearing 18 with an magnetized disk 19 arranged in the center of the lower face of such flat circular bearing 18 and includes in its upper face an arm 20 with which it is fastened to the lower face of such second mobile lower plate 5.

The invention has been sufficiently described so that a person with average knowledge in the matter might reproduce and obtain the results mentioned in this invention. Nevertheless, any skilled person in the technical field related to this invention might be capable of making modifications that are not described in this application, and for the application of these modifications in a determined structure or in the same manufacturing process, the matter claimed in the following claims is required, and such structures shall be comprised within the scope of the invention.

The invention claimed is:

1. A system for transporting a plurality of metallic baking containers comprising:
   a first conveyor operable to feed a plurality of metallic baking containers;
   a second conveyor disposed adjacent to the first conveyor;
   a moveable headstock disposed above the first and second conveyors, the moveable headstock including:
   an upper plate;

a lower moveable plate;

a first actuator attached at an upper end to the upper plate and at a lower end to the lower moveable plate, wherein the first linear actuator is operable to at least one of lower or raise the lower moveable plate;

a plurality of magnetic elements extending from a lower surface of the lower moveable plate, wherein the plurality of magnetic elements is adapted to engage and retain the corresponding plurality of metallic baking containers;

an extendable releasing mechanism operable to dislodge the plurality of metallic baking containers;

at least two secondary actuators, wherein each of the secondary actuators is attached at an upper end to the upper plate and at a lower end to the extendable releasing mechanism and wherein the at least two secondary actuators are operable to extend the extendable releasing mechanism to engage the plurality of metallic baking containers, wherein the first actuator is operable both to extend the plurality of magnetic elements to engage the corresponding plurality of metallic baking containers and to retract the plurality of magnetic elements and corresponding plurality of metallic baking containers; and a transportation mechanism operable to convey the moveable headstock between a position above the first conveyor and a position above the second conveyor along a pair of parallel rails aligned with a conveying direction of the second conveyor.

2. A system for transporting a plurality of metallic baking containers comprising:

a first conveyor operable to feed a plurality of metallic baking containers;

a second conveyor disposed adjacent to the first conveyor;

a moveable headstock disposed above the first and second conveyors, the moveable headstock including:

an upper plate;

a lower moveable plate;

a first actuator attached at an upper end to the upper plate and at a lower end to the lower moveable plate, wherein the first linear actuator is operable to at least one of lower or raise the lower moveable plate;

a plurality of magnetic elements extending from a lower surface of the lower moveable plate, wherein the plurality of magnetic elements is adapted to engage and retain the corresponding plurality of metallic baking containers;

an extendable releasing mechanism operable to dislodge the plurality of metallic baking containers;

at least two secondary actuators, wherein each of the secondary actuators is attached at an upper end to the upper plate and at a lower end to the extendable releasing mechanism and wherein the at least two secondary actuators are operable to extend the extendable releasing mechanism to engage the plurality of metallic baking containers; and a transportation mechanism operable to convey the moveable headstock between a position above the first conveyor and a position above the second conveyor along a pair of parallel rails aligned with a conveying direction of the second conveyor, wherein the plurality of magnetic elements forms one or more rows of magnetic elements, wherein the extendable releasing mechanism includes one or more openings formed therein, wherein each opening encompasses one of the rows of magnetic elements, wherein a width of each opening is wider than a width of the magnetic elements and narrower than a width of the metallic baking containers, and wherein the extendable releasing mechanism is operable to dislodge the plurality of metallic baking containers from the plurality of the magnetic elements by engaging edges of the plurality of the metallic baking containers when the extendable releasing mechanism is extended.

3. A system for transporting a plurality of metallic baking containers comprising:

a first conveyor operable to feed a plurality of metallic baking containers;

a second conveyor disposed adjacent to the first conveyor;

a moveable headstock disposed above the first and second conveyors, the moveable headstock including:

an upper plate;

a lower moveable plate;

a first actuator attached at an upper end to the upper plate and at a lower end to the lower moveable plate, wherein the first linear actuator is operable to at least one of lower or raise the lower moveable plate;

a plurality of magnetic elements extending from a lower surface of the lower moveable plate, wherein the plurality of magnetic elements is adapted to engage and retain the corresponding plurality of metallic baking containers;

an extendable releasing mechanism operable to dislodge the plurality of metallic baking containers;

at least two secondary actuators, wherein each of the secondary actuators is attached at an upper end to the upper plate and at a lower end to the extendable releasing mechanism and wherein the at least two secondary actuators are operable to extend the extendable releasing mechanism to engage the plurality of metallic baking containers; and a transportation mechanism operable to convey the moveable headstock between a position above the first conveyor and a position above the second conveyor along a pair of parallel rails aligned with a conveying direction of the second conveyor, wherein the extendable releasing mechanism forms a grid comprising a plurality of openings, wherein each opening encompasses an individual magnetic element, wherein a width of the openings is wider than a width of the magnetic elements and narrower than a width of the metallic baking containers, and wherein the extendable releasing mechanism is operable to dislodge the plurality of metallic baking containers by engaging edges of the metallic baking containers when the extendable releasing mechanism is extended.

4. A system for transporting a plurality of metallic baking containers comprising:

a first conveyor operable to feed a plurality of metallic baking containers;

a second conveyor disposed adjacent to the first conveyor;

a moveable headstock disposed above the first and second conveyors, the moveable headstock including:

an upper plate;

a lower moveable plate;

a first actuator attached at an upper end to the upper plate and at a lower end to the lower moveable plate, wherein the first linear actuator is operable to at least one of lower or raise the lower moveable plate;

a plurality of magnetic elements extending from a lower surface of the lower moveable plate, wherein the plurality of magnetic elements is adapted to engage and retain the corresponding plurality of metallic baking containers;

an extendable releasing mechanism operable to dislodge the plurality of metallic baking containers;

at least two secondary actuators, wherein each of the secondary actuators is attached at an upper end to the upper plate and at a lower end to the extendable releasing mechanism and wherein the at least two secondary actuators are operable to extend the extendable releasing mechanism to engage the plurality of metallic baking containers; and a transportation mechanism operable to convey the moveable headstock between a position above the first conveyor and a position above the second conveyor along a pair of parallel rails aligned with a conveying direction of the second conveyor, wherein the transportation mechanism comprises:

a first lateral follower attached to a first lateral side of the upper plate; and a second lateral follower attached to a second lateral side, opposite the first lateral side, of the upper plate, wherein the first and second followers are slideable along a corresponding rail of the pair of parallel rails and wherein each of the first and second followers includes a system of sprockets interconnected by a continuous chain operable to convey the first and second followers along the pair of parallel rails.

5. The system according to claim 4, wherein the first and second followers are operably connected to the second conveyor to provide a driving force that drives the first and second followers.

6. A system for transporting a plurality of metallic baking containers comprising:

a first conveyor operable to feed a plurality of metallic baking containers;

a second conveyor disposed adjacent to the first conveyor;

a moveable headstock disposed above the first and second conveyors, the moveable headstock including:

an upper plate;

a lower moveable plate;

a first actuator attached at an upper end to the upper plate and at a lower end to the lower moveable plate, wherein the first linear actuator is operable to at least one of lower or raise the lower moveable plate;

a plurality of magnetic elements extending from a lower surface of the lower moveable plate, wherein the plurality of magnetic elements is adapted to engage and retain the corresponding plurality of metallic baking containers;

an extendable releasing mechanism operable to dislodge the plurality of metallic baking containers;

at least two secondary actuators, wherein each of the secondary actuators is attached at an upper end to the upper plate and at a lower end to the extendable releasing mechanism and wherein the at least two secondary actuators are operable to extend the extendable releasing mechanism to engage the plurality of metallic baking containers; and a transportation mechanism operable to convey the moveable headstock between a position above the first conveyor and a position above the second conveyor along a pair of parallel rails aligned with a conveying direction of the second conveyor, wherein the transportation mechanism comprises:

a first lateral follower attached to a first lateral side of the upper plate;

a second lateral follower attached to a second lateral side, opposite the first lateral side, of the upper plate; and at least one third linear actuator attached at a first end to the upper plate and adapted to be attached to a supporting structure at a second end, opposite the first end, wherein the at least one third linear actuator is operable to convey the moveable headstock along the pair of parallel rails.

* * * * *